United States Patent
Okuda et al.

(10) Patent No.: US 9,002,527 B2
(45) Date of Patent: Apr. 7, 2015

(54) VALVE POSITIONER WITH CURRENT ALLOCATING DEVICE

(75) Inventors: Kouji Okuda, Tokyo (JP); Hiroaki Nagoya, Tokyo (JP); Kouichirou Murata, Tokyo (JP)

(73) Assignee: Azbil Corporation, Tokyo (JP)

( * ) Notice: Subject to any disclaimer, the term of this patent is extended or adjusted under 35 U.S.C. 154(b) by 517 days.

(21) Appl. No.: 13/419,670

(22) Filed: Mar. 14, 2012

(65) Prior Publication Data
US 2012/0249019 A1    Oct. 4, 2012

(30) Foreign Application Priority Data
Mar. 30, 2011    (JP) .................................. 2011-076180

(51) Int. Cl.
| G06F 19/00 | (2011.01) |
|---|---|
| F15B 13/043 | (2006.01) |
| F15B 21/08 | (2006.01) |
| F16K 31/00 | (2006.01) |
| G05D 13/00 | (2006.01) |

(52) U.S. Cl.
CPC ............. F15B 13/0438 (2013.01); *F16K 31/00* (2013.01); *G05D 13/00* (2013.01); *F15B 21/087* (2013.01)

(58) Field of Classification Search
CPC ................................ F16K 31/00; G05D 13/00
USPC ...................................... 700/282; 251/129.01
See application file for complete search history.

(56) References Cited

U.S. PATENT DOCUMENTS

| 2,574,373 | A | * | 11/1951 | Bivens ........................... 327/282 |
|---|---|---|---|---|
| 2,948,295 | A | * | 8/1960 | Smith, Jr. ...................... 137/487.5 |
| 6,519,508 | B1 | | 2/2003 | Saito |
| 7,211,990 | B2 | * | 5/2007 | Loechner ....................... 323/233 |
| 7,890,216 | B2 | * | 2/2011 | Boger et al. ................... 700/282 |
| 2005/0007077 | A1 | * | 1/2005 | Loechner ....................... 323/222 |
| 2006/0092039 | A1 | * | 5/2006 | Saito et al. ............... 340/825.37 |
| 2008/0163936 | A1 | * | 7/2008 | Boger et al. ................... 137/455 |
| 2012/0248352 | A1 | * | 10/2012 | Okuda ..................... 251/129.01 |

(Continued)

FOREIGN PATENT DOCUMENTS

| JP | 11-304033 A | 11/1999 |
|---|---|---|
| JP | 2000-304148 A | 11/2000 |
| JP | 2004-151941 A | 5/2004 |

OTHER PUBLICATIONS

Process Control and Optimization, vol. II, chapter 6.2. "Accessories and Positioners", Bela Liptak, 2006.*

(Continued)

*Primary Examiner* — Michael D Masinick
(74) *Attorney, Agent, or Firm* — Troutman Sanders LLP

(57) ABSTRACT

A coil of an electro-pneumatic converting portion is connected in parallel with a constant voltage circuit. An electric current regulating portion is provided in a supply line for an electric current to the coil. The regulating value for the electric current in this electric current regulating portion is controlled by an instruction from a CPU. The CPU detects, as a present supply electric current, an actual value for the supply electric current from a higher-level system, and evaluates whether or not there is, in the present supply electric current, a surplus electric current that can be directed to the electro-pneumatic converting portion. The supply electric current can be in excess of 4 mA and is the surplus electric current, and if there is a surplus electric current, then a command is sent to the electric current regulating portion so as to allocate that surplus electric current to the coil.

4 Claims, 6 Drawing Sheets

(56) References Cited

U.S. PATENT DOCUMENTS

2012/0248356 A1* 10/2012 Okuda et al. ............. 251/129.15
2012/0249019 A1* 10/2012 Okuda et al. .................. 318/135
2013/0134335 A1* 5/2013 Wirkowski et al. ...... 251/129.01

OTHER PUBLICATIONS

Chinese Office Action dated Aug. 26, 2014, which issued during prosecution of Chinese Application No. 2012100825861, which corresponds to the present application.

* cited by examiner

| Category | Electric Current Range (mA) | Combination of Functions |
|---|---|---|
| 1 | 0 through 4 | A + B(L) + C(L) |
| 2 | 4 through 16 | A(X) + B(L) + C(L) |
| 3 | 16 through 18 | A(X) + B(H) + C(L) |
| 4 | 18 through 20 | A(X) + B(H) + C(H) |

| Category | Electric Current Range (mA) | Combination of Functions |
|---|---|---|
| 1 | 0 through 4 | A + B(L) + C(L) |
| 2 | 4 through 16 | A(X) + B(L) + C(L) |
| 3 | 16 through 18 | A(X) + B(Hable) + C(L) |
| 4 | 18 through 20 | A(X) + B(Hable) + C(Hable) |

| Category | Electric Current Range (mA) | Combination of Functions |
|---|---|---|
| 1 | 0 through 4 | A + B(L) + C(L) |
| 2 | 4 through 16 | A(X) + B(L) + C(L) |
| 3 | 16 through 18 | A(X) + B(L) + C(Hable) |
| 4 | 18 through 20 | A(X) + B(Hable) + C(Hable) |

VALVE POSITIONER WITH CURRENT ALLOCATING DEVICE

CROSS REFERENCE TO RELATED APPLICATIONS

The present application claims priority under 35 U.S.C. §119 to Japanese Patent Application No. 2011-076180, filed Mar. 30, 2011, which is incorporated herein by reference.

FIELD OF TECHNOLOGY

The present invention relates to a field device, such as a positioner for receiving the supply of an electric current through a pair of electric wires from a higher-level system, and for controlling the degree of opening of a regulator valve in accordance with the value of the supply electric current.

BACKGROUND

Conventionally this type of positioner is designed so as to operate with an electric current between 4 and 20 mA sent through a pair of electric wires from a higher-level system. For example, if a current of 4 mA is sent from the higher-level system, the opening of the regulator valve is set to 0%, and if a current of 20 mA is sent, then the opening of the regulator valve is set to 100%.

In this case, the supplied electric current from the higher-level system varies in the range of 4 mA (the lower limit electric current value) through 20 mA (the higher limit electric current value), and thus the internal circuitry within the positioner operates on an electric current of no more than the 4 mA that can always be secured as an electric current value that is supplied from the higher-level system (See, For Example, Japanese Unexamined Patent Application Publication 2004-151941). Note that this electric current is known as the minimum operating electric current, and is, for example, about 3.8 mA.

FIG. 7 is illustrates the critical components in a conventional positioner. This positioner 100 receives a supply of an electric current I through a pair of electric wires L1 and the L2 from the higher-level system 200 and produces its own operating power supply from the electric current I that is supplied, and, on the other hand, also controls the degree of opening of a regulator valve, not shown, in accordance with the value of the supplied electric current I.

The positioner 100 is provided with a main circuit 2 that includes a CPU (a central calculation processing portion) 1, constant voltage circuit 3 that includes a zener diode D1, and electro-pneumatic converting portion 4 for converting an electric signal from the main circuit 2 into an air pressure signal, and a resistor R1.

The constant voltage circuit 3 and the resistor R1 are connected in series between the terminals T1 and T2 through which the current I from the higher-level system 200 is inputted/outputted, and the connecting point between the constant voltage circuit 3 and the resistor R1 is grounded. Note that the electro-pneumatic converting portion 4 has a coil 4-1 for driving a nozzle flapper mechanism (not shown), where the electric signal from the main circuit 2 is supplied to the coil 4-1.

In this positioner 100, the constant voltage circuit 3 produces a constant voltage V1 from the supply electric current I from the higher-level system 200, and supplies that produced constant voltage V1 to the main circuit 2 as an operating power supply. The CPU 1 in the main circuit 2 inputs a voltage Vs that is produced on the outflow side of the electric current I of the resistor R1 as the target opening θ sp, that is, inputs, as the target opening θ sp, a voltage Vs in accordance with the value of the supply electric current I from the higher-level system 200, and inputs a voltage Vr that is fed back from the regulator valve as the actual openings θ pv of the regulator valve, and supplies an electric signal to the coil 4-1 of the electro-pneumatic converting portion 4 such that the target opening θ sp and the actual opening θ pv match.

In this circuit structure, an electric current I that varies between 4 and 20 mA is supplied from the higher-level system 200, and of this supply electric current I, an electric current that is consumed by the circuit (the operating electric current) Ic flows to the line LA on the main circuit 2 side, where any surplus electric current above this operating electric current Ic flows to the line LB on the constant voltage circuit 3 side as a surplus electric current Iv (where Iv=I−Ic). Moreover, as illustrated in FIG. 8, an electric current Id of between 0 and 0.7 mA flows in the coil 4-1 of the electro-pneumatic converting portion 4 depending on the change in the 4 through 20 mA (θ sp=0 through 100%) in the supply electric current I.

On the other hand, in the positioner disclosed in Japanese Unexamined Patent Application Publication H11-304033 (Japanese Patent Number 3596293) ("JP '033") and Japanese Unexamined Patent Application Publication 2000-304148 (Japanese Patent Number 3635982) ("JP '148"), the coil for the electro-pneumatic converting portion and the other circuits are connected in series, and the coil for the electro-pneumatic converting portion is provided on the upstream side. Doing so makes it possible to increase the electric current that flows in the coil of the electro-pneumatic converting portion, increasing the margin of stability relative to noises such as temperature, and the like, and increasing the responsiveness of the regulator valve.

However, while even though the electric current that flows in the electro-pneumatic converting portion is larger in the methods disclosed in JP '033 and JP '148, the internal circuitry is connected in series (where the coil of the electro-pneumatic converting portion and the other circuits are connected in series), and thus the impedance within the internal circuitry is high, increasing the terminal-to-terminal voltage for the positioner to operate (the minimum operating terminal voltage). Because of this, it is difficult to connect two positioners in series (double connection) between two transmission lines (a pair of electric wires), and difficult to achieve methods of use wherein other loads are connected.

For example, when the supply voltage from the two transmission lines is 15 V, then if two positioners were connected in series, then the terminal voltages of the positioners would be 7.5 V. In this case, because the internal circuitry is connected in series in the methods set forth in JP '033 and JP '148, the minimum operating terminal voltage of the positioner is 12 V, making it impossible to connect two positioners in series between two transmission lines. In this case, a supply voltage of 24 V from the two transmission lines is necessary in order to connect two positioners in series.

Moreover, in recent years there have been requests for incorporating, as added functions, functions such as regulator valve fault diagnostic and fault self-diagnostic, and the like, in addition to the primary function (the basic function) of controlling the degree of opening of the regulator valve in a positioner. However, when responding to such demands for multifunctionality, it is necessary to allocate electric current for operating the function circuit portions for the added functions, where these portions necessarily reduce the electric current allocated to the function circuit portion for the basic function, which may compromise the basic function.

The examples of the present invention were created in order to solve this type of problem, and the object thereof is to provide a positioner able to keep the impedance of the internal circuitry low and to operate the function circuit portions of added functions, such as fault diagnostic of the regulator valve and fault self-diagnostic, without increasing the electric current to the function circuit portions such as the electro-pneumatic converting portion, and without sacrificing the basic function.

SUMMARY

The examples of the present invention, in order to solve this type of problem are a positioner for receiving the supply of an electric current through a pair of electric wires from a higher-level system, and for controlling the degree of opening of a regulator valve in accordance with the value of the supply electric current, including a constant voltage circuit for producing a constant voltage as a local operating power supply from the supply electric current; a function circuit portion that is connected in parallel with the constant voltage circuit; supply electric current detector for detecting, as the present supply electric current, an actual value for the supply electric current; and surplus electric current allocating device for evaluating whether or not there is, in the detected present supply electric current, surplus electric current that can be directed to the function circuit portion, and, if there is surplus electric current, for allocating the surplus electric current to the function circuit portion.

In this example of the invention, the actual value of the supply electric current is detected as the present supply electric current, an evaluation as to whether or not there is, within the detected present supply electric current, surplus electric current that can be directed towards a function circuit portion, and if there is a surplus electric current, then that surplus electric current is allocated to a function circuit portion. Moreover, because the function circuit portions are connected in parallel with a constant voltage circuit, the impedance of the internal circuitry is kept low. As a result, when the function circuit portion is the electro-pneumatic converting portion, it is possible to increase the electric current to the electro-pneumatic converting portion while keeping the impedance of the internal circuitry low. Moreover, when the function circuit portion is a function circuit portion for an added function, such as fault diagnostic for the regulator valve or a fault self-diagnostic, or the like, it is possible to operate the function circuit portion for the added functions without sacrificing the basic function. Furthermore, when the function circuit portion is a function circuit portion for the basic function that includes a central calculation processing device, it is possible to produce an improvement in controllability and responsiveness by, for example, increasing the operating speed of the central calculation processing device.

In the examples of the present invention, a function circuit portion is connected in parallel with a constant voltage circuit, where an actual value for the supply electric current is detected as a present supply electric current, a decision is made as to whether or not there is, in the present supply electric current, a surplus electric current that can be directed towards a function circuit portion, and if there is a surplus electric current, that surplus electric current is allocated to a function circuit portion, making it possible to increase the electric current to a function circuit portion such as an electro-pneumatic converting portion, and to operate function circuit portions of added functions, such as regulator valve diagnostic and self-diagnostic, without sacrificing the basic function, while keeping the impedance of the internal circuitry low.

BRIEF DESCRIPTION OF THE DRAWINGS

FIG. 4 is a diagram illustrating an example of a table used in this positioner.

FIG. 5 is a diagram illustrating another example of a table used in this positioner.

FIG. 6 is a diagram illustrating another example of a table used in this positioner.

DETAILED DESCRIPTION

Examples according to the present invention are explained below in detail, based on the drawings.

Figure 1:
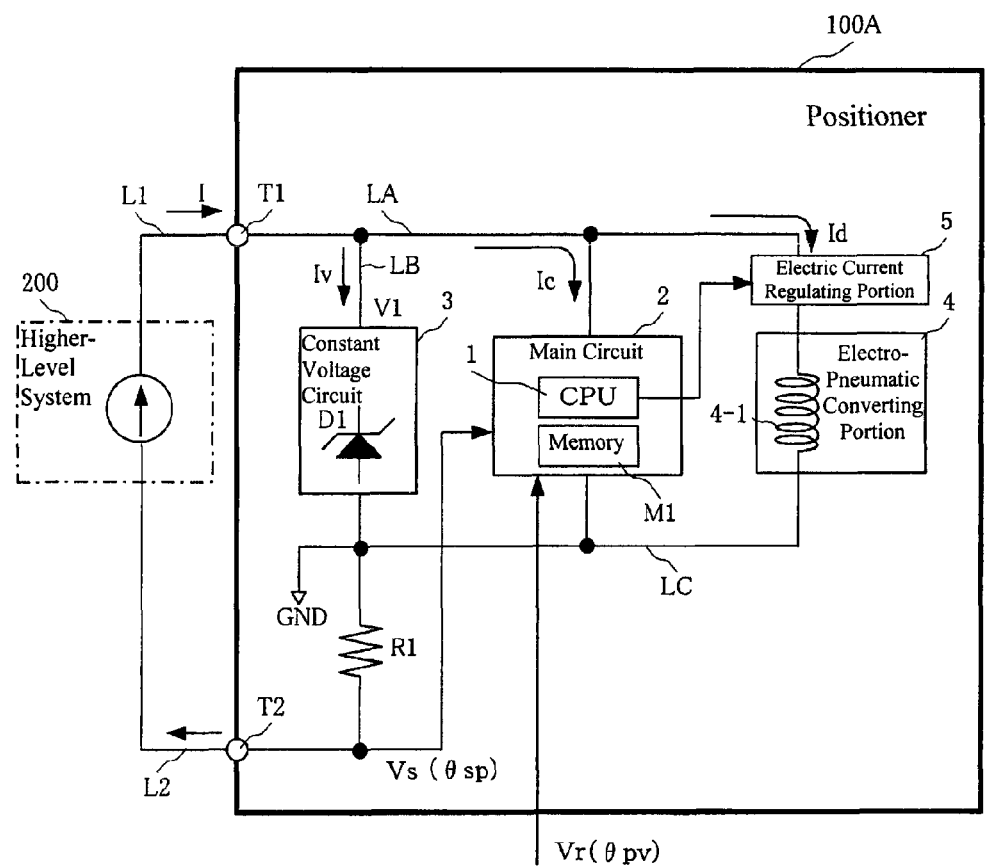
FIG. 1 is a diagram illustrating the structure of the critical components of an example of a positioner according to the present invention.

FIG. 1 is a structural diagram of an example of a positioner according to the present invention. In this figure, codes that are the same as those in FIG. 7 indicate identical or equivalent structural elements as the structural elements explained in reference to FIG. 7, and explanations thereof are omitted.

In this example, an electro-pneumatic converting portion 4 is connected in parallel with a constant voltage circuit 3. That is, a coil 4-1 of the electro-pneumatic converting portion 4 is connected between a supply line LA for a constant voltage V1 and a ground line LC from the constant voltage circuit 3, so as to produce an electric current Id in the coil 4-1. Moreover, an electric current regulating portion 5 is provided in the supply line for the electric current Id to the coil 4-1, where the regulated value for the electric current in this electric current regulating portion 5 is controlled through an instruction from a CPU 1 in a main circuit 2.

The CPU 1 operates following a program that is stored in a memory M1, to detect, as an actual value of the supply electric current I (the present supply electric current), the voltage Vs that is produced at the downstream side of the electric current I of a resistor R1, to evaluate whether or not there is, in this present supply electric current, a surplus electric current that can be directed to the electro-pneumatic converting portion 4. In the present example, the CPU 1 defines as a surplus electric current any supply electric current in excess of 4 mA. Moreover, if there is a surplus electric current, the CPU 1 sends a command to the electric current regulating portion 5 to allocate this surplus electric current to the coil 4-1 of the electric-pneumatic converting portion.

Figure 2:
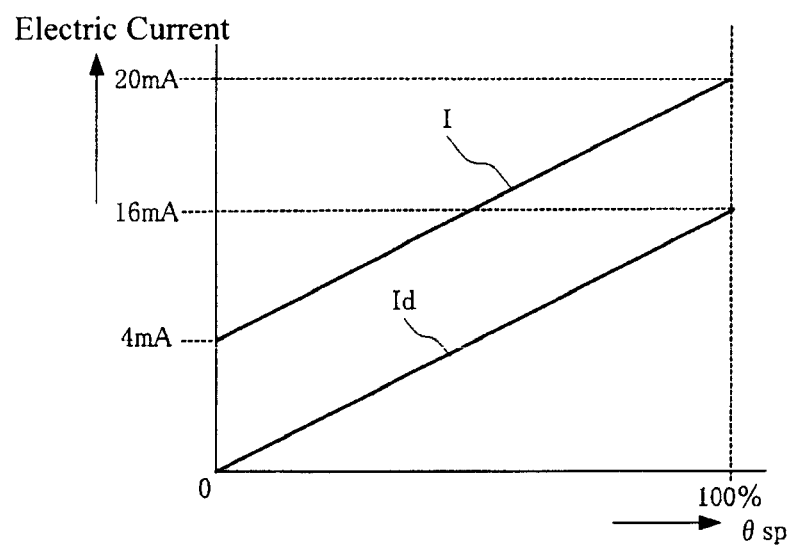
FIG. 2 is a diagram illustrating the relationship between the supply electric current from the higher-level system, supplied to the positioner, and the electric current that is supplied to the coil of the electro-pneumatic converting portion.

As a result, if as shown in FIG. 2, the supply electric current I from the higher-level system 200 is 4 mA, then the electric current Id to the coil 4-1 will be 0 mA, but if the supply electric current from the higher-level system 200 is 20 mA, then the electric current Id to the coil 4-1 will be 16 mA.

Figure 7:
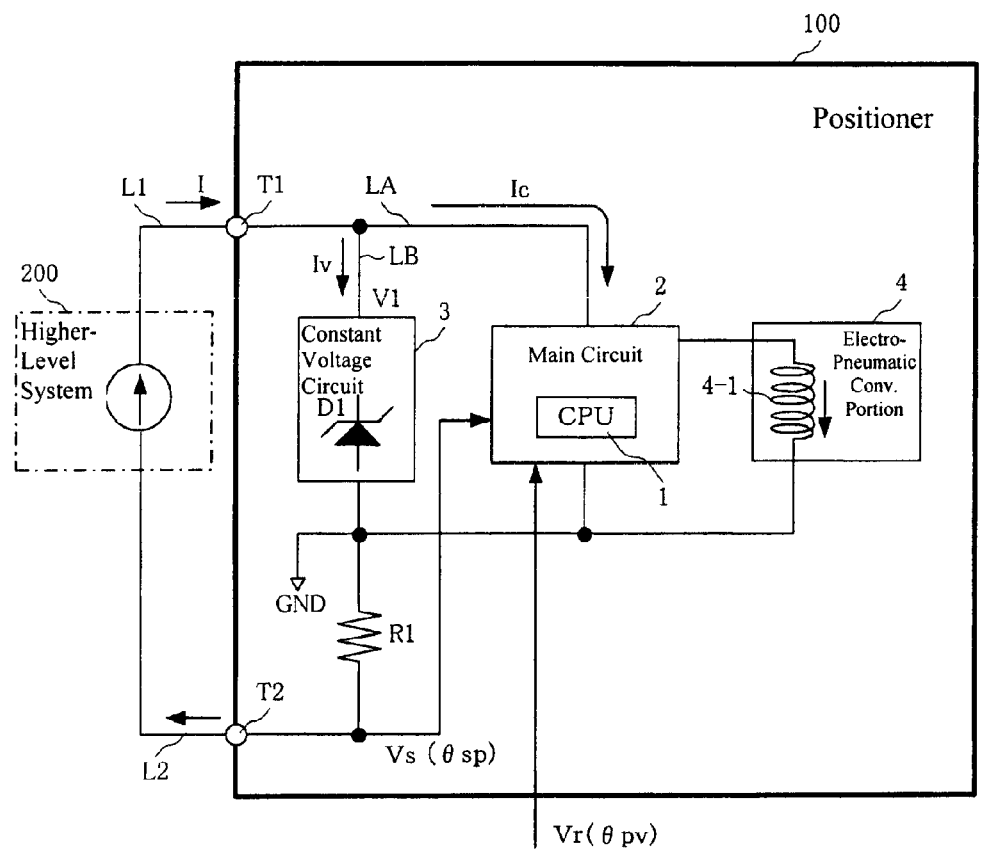
FIG. 7 is a diagram illustrating the critical components in a conventional positioner.
Figure 8:
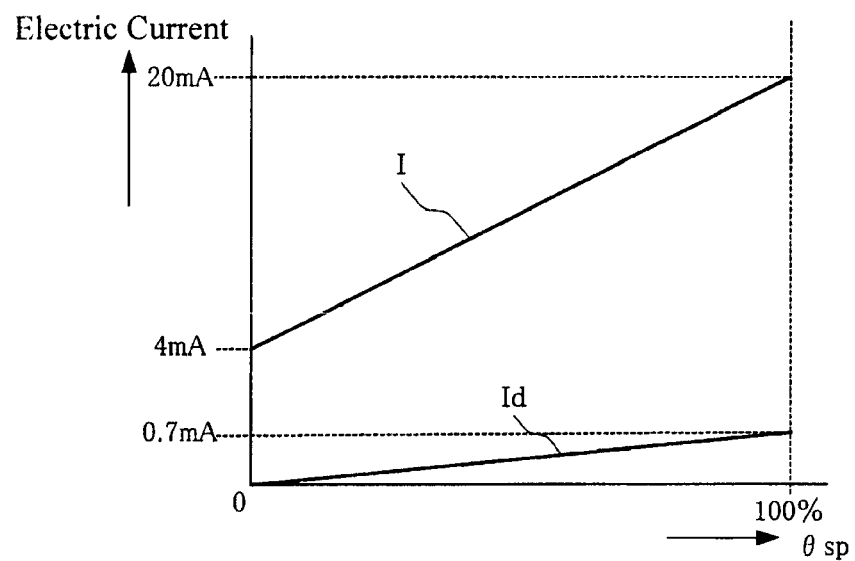
FIG. 8 is a diagram illustrating the relationship between the supply electric current from the higher-level system, supplied to a conventional positioner, and the electric current that is supplied to the coil of the electro-pneumatic converting portion.

That is, in the positioner 100 illustrated in FIG. 7, the surplus electric current Iv merely flows to the line LB on the constant voltage circuit 3 side to be returned as-is to the higher-level system 200, but in the positioner 100A in the present example, this surplus electric current Iv is used effectively as an electric current Id to the coil 4-1.

As a result, the electric current that flows in the coil 4-1 is increased, increasing the margin of stability relative to outside noises such as temperature, and the like, and improving the responsiveness of the regulator valve. Moreover, because the coil 4-1 is connected in parallel with the constant voltage circuit 3, the impedance of the internal circuitry is kept low. This makes it possible to keep the terminal voltage level, making it possible to connect two positioners 100A in series between two transmission lines, and possible to achieve a method of use wherein another load is connected.

Figure 3:
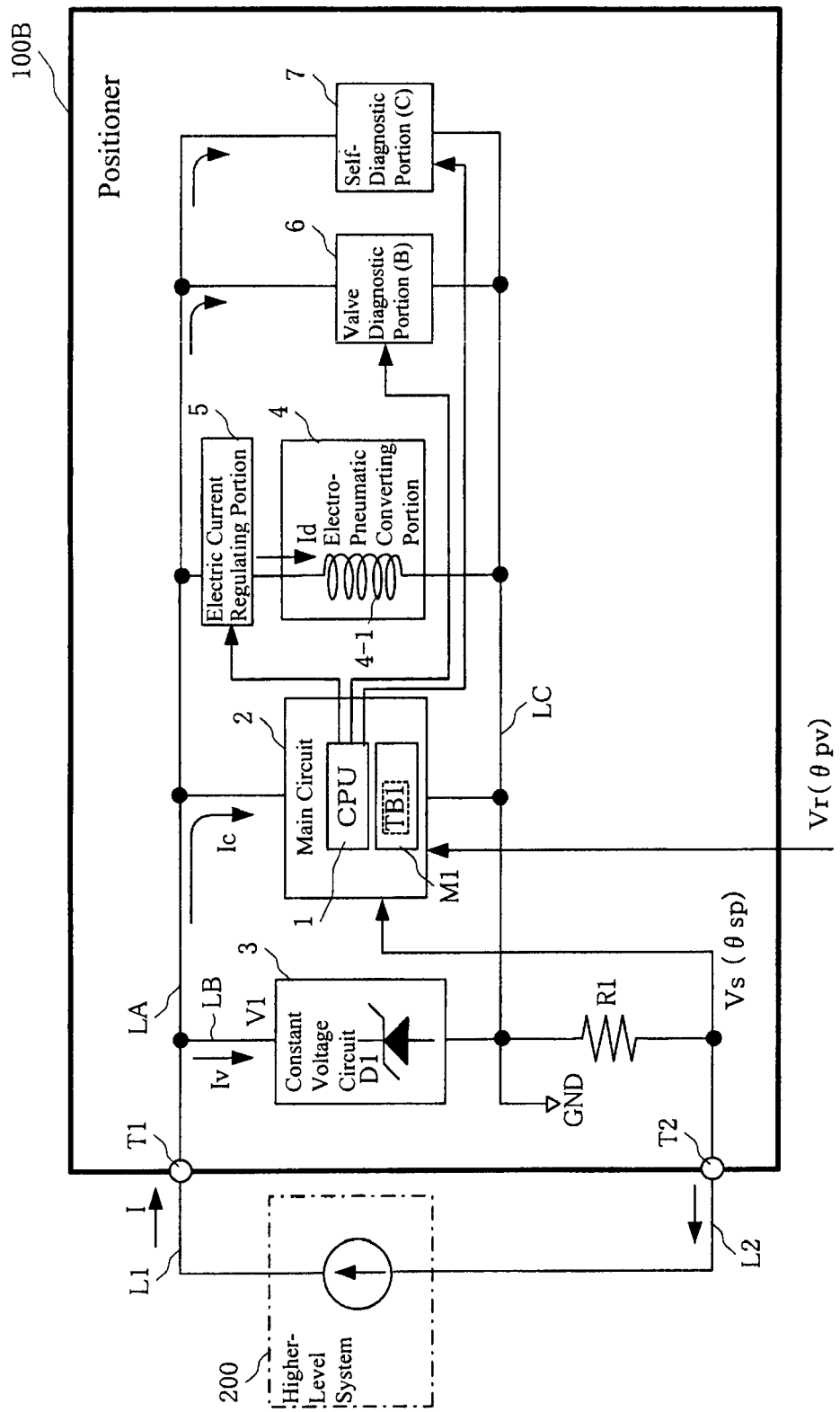
FIG. 3 is a diagram illustrating the structure of the critical components of another example of a positioner.

FIG. 3 illustrates an example of the provision of an added function, such as fault diagnostic for the regulator valve or fault self-diagnostic, to the positioner 100A illustrated in FIG. 1.

In the positioner 100B in this example, a valve diagnostic portion 6 is provided as a function circuit portion for performing fault diagnostic on the regulator valve, and a self-diagnostic portion 7 is provided as a function circuit portion for performing fault self-diagnostic. As with the electro-pneumatic converting portion 4 that was provided as a single function circuit portion, the valve diagnostic portion 6 and the self-diagnostic portion 7 are also connected in parallel with the constant voltage circuit 3.

In the below, the function for performing the electro-pneumatic conversion in the electro-pneumatic converting portion 4 is defined as function A, the function for performing the fault diagnostic on the regulator valve in the valve diagnostic portion 6 is defined as function B, and the function for performing fault self-diagnostic in the self-diagnostic portion 7 is defined as function C.

The CPU 1 of the main circuit 2 operates following a program that is stored in the memory M1, to control the value of the electric current Id to the coil 4-1 of the electro-pneumatic converting portion 4, and also to control the "H"/"L" of the operating mode for the valve diagnostic portion 6 and the self-diagnostic portion 7.

The memory M1 stores, in addition to the aforementioned program, a table TB1 wherein the range of electric currents that can be assumed by the supply electric current I (between 0 and 20 mA) is categorized into a plurality of electric current ranges, and wherein a combination of function circuit portions to which the surplus electric current is to be assigned is determined for each categorized electric current range.

An example of the table TB1 is shown in Table 4. In this table TB1, the range of electric current that can be assumed by the supply electric current I (0 through 20 mA) is categorized into four electric current ranges, where "A+B(L)+C(L)" is established as the combination of functions for the electric current range of Category 1 (0 through 4 mA), "A(X)+B(L)+C(L)" is established as the combination of functions for the electric current range of Category 2 (4 through 16 mA), "A(X)+B(H)+C(L)" is established as the combination of functions for the electric current range of Category 3 (16 through 18 mA), and "A(X)+B(H)+C(H)" is established as the combination of functions for the electric current range of Category 4 (18 through 20 mA).

Note that "B(L)" and "C(L)" indicate setting the operating mode of the functions B and C to "L" (limited operation), and "B(H)" and "C(H)" indicate setting the operating mode of the functions B and C to "H" (full operation). In this case, in the operating mode "H" for the function B, the surplus electric current is allocated thereto, but in the operating mode "L" for the function B, the surplus electric current is not allocated thereto. Similarly, in the operating mode "H" for the function C, the surplus electric current is allocated thereto, but in the operating mode "L" for the function C, the surplus electric current is not allocated thereto. Moreover, while "A" indicates that the surplus electric current is not allocated to the function A, "A(X)" indicates that the surplus electric current is allocated to the function A.

Consequently, in the table TB1 that is shown in FIG. 4, the "A+B(L)+C(L)" that is established for the electric current range in Category 1 indicates that there is no function circuit portion to which the surplus electric current is allocated, the "A(X)⇆B(L)+C(L)" that is established for the electric current range in Category 2 indicates that the combination of function circuit portions to which the surplus electric current is allocated is only the function circuit portion for the function A, and the "A(X)+B(H)+C(L)" that is established for the electric current range in Category 3 indicates that the combination of function circuit portions to which the surplus electric current is allocated is the function circuit portions for function A and function B, and the "A(X)+B(H)+C(H)" that is established for the electric current range in Category 4 indicates that the combination of function circuit portions to which the surplus electric current is allocated is the function circuit portions for function A, function B, and function C.

Category 1: When the Electric Current Range is 0 Through 4 mA

Here it is assumed that the supply electric current I from the higher-level system 200 is within the range of 0 through 4 mA. In this case, the CPU 1 ascertains that the actual value of the supply electric current I (the present supply electric current) applies to the electric current range of Category 1, and reads out, from table TB1, "A+B(L)+C(L)" as the combination of functions of the electric current range of the applicable Category 1, and establishes the allocation of the surplus electric current in accordance with this combination of functions that has been read out.

In this case, "A+B(L)+C(L)" indicates that there is no function circuit portion to which the surplus electric current is to be allocated, and thus the CPU 1 evaluates that there is no surplus electric current that can be directed toward the function circuit portions for the functions A, B, and C, and so defines the electric current Id to the coil 4-1 of the electro-pneumatic converting portion 4, which is the function circuit portion for the function A, as 0 mA, and sets the operating mode for the valve diagnostic portion 6, which is the function circuit portion for function B, to "L", and sets the operating mode for the self-diagnostic portion 7, which is the function circuit portion for the function C, to "L".

Category 2: When the Electric Current Range is 4 Through 16 mA

Here it is assumed that the supply electric current I from the higher-level system 200 has changed to be within the range of 4 through 16 mA. In this case, the CPU 1 ascertains that the actual value of the supply electric current I (the present supply electric current) applies to the electric current range of Category 2, and reads out, from table TB1, "A(X)+B(L)+C(L)" as the combination of functions of the electric current range of the applicable Category 1, and establishes the allocation of the surplus electric current in accordance with this combination of functions that has been read out.

In this case, the "A(X)+B(L)+C(L)" indicates that the combination of function circuit portions to which the surplus electric current is to be allocated is only the function circuit portion for the function A, and thus the CPU 1 evaluates that there is a surplus electric current that can be directed to the function circuit portion for the function A, defined as surplus electric current (a first surplus electric current) that portion of the supply electric current I that is in excess of 4 mA, and sends an instruction to the electric current regulating portion 5 to allocate this surplus electric current to the coil 4-1 of the electro-pneumatic converting portion 4 that is the function circuit portion for the function A.

Category 3: When the Electric Current Range is 16 Through 18 mA

Here it is assumed that the supply electric current I from the higher-level system 200 has changed to be within the range of 16 through 18 mA. In this case, the CPU 1 ascertains that the actual value of the supply electric current I (the present supply electric current) applies to the electric current range of Category 3, and reads out, from table TB1, "A(X)+B(H)+C(L)" as the combination of functions of the electric current range of the applicable Category 1, and establishes the allocation of the surplus electric current in accordance with this combination of functions that has been read out.

In this case, the "A(X)+B(H)+C(L)" indicates that the combination of function circuit portions to which the surplus electric current is to be allocated is the function circuit portions for the function A and the function B, and thus the CPU evaluates that there is a surplus electric current that can be directed towards the function circuit portion for the function B in addition to that for the function A, and further defines that portion of the supply electric current I that is in excess of 16 mA as a second surplus electric current, and switches to "H" the operating mode of the valve diagnostic portion 6 that is the function circuit portion for the function B. Doing so causes the second surplus electric current to be allocated to the valve diagnostic portion 6 while maintaining the allocation of the first surplus electric current to the coil 4-1 of the electro-pneumatic converting portion, to cause full operation of the valve diagnostic portion 6. In this case there is no reduction in the electric current to the main circuit 2, so there is no risk of a compromise in the basic function.

Category 4: When the Electric Current Range is 18 Through 20 mA

Here it is assumed that the supply electric current I from the higher-level system 200 has changed to be within the range of 18 through 20 mA. In this case, the CPU 1 ascertains that the actual value of the supply electric current I (the present supply electric current) applies to the electric current range of Category 4, and reads out, from table TB1, "A(X)+B(H)+C(H)" as the combination of functions of the electric current range of the applicable Category 1, and establishes the allocation of the surplus electric current in accordance with this combination of functions that has been read out.

In this case, the "A(X)+B(H)+C(H)" indicates that the combination of function circuit portions to which the surplus electric current is to be allocated is the function circuit portions for function A, function B, and function C, and thus the CPU evaluates that there is a surplus electric current that can be directed towards the function circuit portion for the function C in addition to that for the function A and the function B, and further defines that portion of the supply electric current I that is in excess of 18 mA as a third surplus electric current, and switches to "H" the operating mode of the self-diagnostic portion 7 that is the function circuit portion for the function C. Doing so causes the third surplus electric current to be allocated to the self-diagnostic portion 7 to cause full operation of the self-diagnostic portion 7 while maintaining the allocation of the first surplus electric current to the coil 4-1 of the electro-pneumatic converting portion and maintaining the main operation of the valve diagnostic portion 6 through the receipt of the allocation of the second surplus electric current. In this case there is no reduction in the electric current to the main circuit 2, so there is no risk of a compromise in the basic function.

Note that while in FIG. 4 a combination of function circuit portions for the allocation of the surplus electric current was established for each category of the electric current range in the table TB1, instead the determination may be made through an instruction from the higher-level system 200. For example, as illustrated in FIG. 5, "A(X)+B(Hable)+C(L)" may be established as the combination of functions for the electric current range in Category 3, "A(X)+B(Hable)+C(Hable)" may be established as the combination of functions for the electric current range in Category 4, where "B(Hable)" and "C(Hable)" are to be established as "B(H)" or "C(H)" through an instruction from the higher-level system 200.

In this case, "B(Hable)" indicates that there may be a change from "B(L)" to "B(H)" through an instruction from the higher-level system 200, and "C(Hable)" indicates that there may be a change from "C(L)" to "C(H)" through an instruction from the higher-level system 200. Consequently, as illustrated in FIG. 6, if in Category 3 there is "A(X)+B(L)+C(Hable)", then the function C can be changed from "C(L)" to "C(H)" but the function B cannot be changed from "B(L)" to "B(H)".

Moreover, while in the structure illustrated in FIG. 3, the surplus electric current is allocated to the valve diagnostic portion 6 or the self-diagnostic portion 7 after the coil 4-1 of the electro-pneumatic converting portion 4, it is possible to allocate the surplus electric current to only the valve diagnostic portion 6 or the self-diagnostic portion 7, without allocating the surplus electric current to the coil 4-1 of the electro-pneumatic converting portion 4.

Moreover, the function circuit portions for added functions are not limited to the valve diagnostic portion 6 or the self-diagnostic portion 7, but may be added function circuit portions such as sensors (for pressure, acceleration, and temperature), or the like, and may be switched to a standby mode, to limited operation, or to full operation.

Moreover, when a main circuit 2 that includes a CPU 1 is the function circuit portion and there is a surplus electric current, then the surplus electric current may be allocated to the main circuit 2 itself, to increase the operating speed of the CPU 1. Doing enables an improvement in the controllability and responsiveness.

Moreover, while in the example set forth above the supply electric current in excess of 4 mA was defined as the surplus electric current, instead the electric current in excess of 3.8 mA, which is the minimum operating electric current for the internal circuitry, may be defined as the surplus electric current, and, of course, the categories for the electric current ranges and the combinations of functions may be set freely.

The invention claimed is:

1. A positioner for receiving the supply of an electric current through a pair of electric wires from a higher-level system, and for controlling the degree of opening of a regulator valve in accordance with the value of the supply electric current, comprising:

a constant voltage circuit producing a constant voltage as a local operating power supply from the supply electric current;

a plurality of function circuit portions connected in parallel with the constant voltage circuit;

a supply electric current detector detecting, as the present supply electric current, an actual value for the supply electric current;

a surplus electric current allocating device evaluating whether or not there is, in the detected present supply electric current, surplus electric current that can be directed to the function circuit portion, and, if there is surplus electric current, allocating the surplus electric current to the function circuit portion; and a storage device categorizing, into a plurality of electric current ranges, the range of electric currents that can be assumed by the supply electric current, and storing a table wherein a combination of the function circuit portions to which the surplus electric current is allocated is established for each category of electric current range, wherein the surplus electric current allocating device ascertains the category of electric current range to which the detected present supply electric current applies, reads out, from the table, the combination of function circuit portions established for the applicable electric current range category, and allocates the surplus electric current to the function circuit portions of the combination that has been read out.

2. The positioner as set forth in claim 1, wherein:
in the table, an operating mode of a function circuit portion is specified in the combination of function circuit portions to which the surplus electric power is allocated.

3. The positioner as set forth in claim 1, wherein:
the combination of function circuit portions to which the surplus electric current is allocated in the table is determined through an instruction from the higher-level system.

4. The positioner as set forth in claim 1, wherein:
the function circuit portion includes a central calculation processing device; and
the surplus electric current allocating device increases the speed of operation of the central calculation processing device of the function circuit portion by allocating the surplus electric current to the function circuit portion when there is a surplus electric current.

* * * * *